United States Patent
Guardiani

(10) Patent No.: US 11,748,261 B2
(45) Date of Patent: Sep. 5, 2023

(54) AUTOMATIC ADDRESS GENERATION FOR MODULAR ELECTRONIC DEVICES

(71) Applicant: Eaton Intelligent Power Limited, Dublin (IE)

(72) Inventor: Marc Michael Guardiani, Allison Park, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 237 days.

(21) Appl. No.: 16/937,674

(22) Filed: Jul. 24, 2020

(65) Prior Publication Data
US 2022/0027266 A1  Jan. 27, 2022

(51) Int. Cl.
| | |
|---|---|
| G06F 9/35 | (2018.01) |
| G06F 13/36 | (2006.01) |
| G06F 13/42 | (2006.01) |
| G06F 13/40 | (2006.01) |
| G06F 12/06 | (2006.01) |
| G06F 9/355 | (2018.01) |

(52) U.S. Cl.
CPC ........ *G06F 12/0676* (2013.01); *G06F 9/3552* (2013.01); *G06F 12/0661* (2013.01); *G06F 13/36* (2013.01); *G06F 13/404* (2013.01); *G06F 13/4282* (2013.01); *G06F 2213/0052* (2013.01)

(58) Field of Classification Search
CPC ............. G06F 12/0676; G06F 9/3552; G06F 12/0661; G06F 13/36; G06F 13/404; G06F 13/4282; G06F 2213/0052
See application file for complete search history.

(56) References Cited

U.S. PATENT DOCUMENTS

| | | | |
|---|---|---|---|
| 7,685,320 B1* | 3/2010 | Wishneusky | G06F 1/26 713/340 |
| 9,335,786 B2 | 5/2016 | Stewart et al. | |
| 2008/0301344 A1* | 12/2008 | Hsieh | G06F 13/4282 710/110 |
| 2011/0082955 A1* | 4/2011 | Wortham | G06F 13/4256 710/110 |
| 2013/0151742 A1* | 6/2013 | Kita | G06F 13/4054 710/110 |

(Continued)

FOREIGN PATENT DOCUMENTS

| | | |
|---|---|---|
| DE | 100 38 783 A1 | 3/2001 |
| DE | 20 2016 1 04113 U1 | 8/2016 |
| WO | 2004/095300 A1 | 11/2004 |

OTHER PUBLICATIONS

European Patent Office "International Search Report and Written Opinion" from corresponding International (PCT) patent application No. PCT/EP2021/025260, dated Oct. 22, 2021, 12 pp.

*Primary Examiner* — Henry Tsai
*Assistant Examiner* — Harry Z Wang
(74) *Attorney, Agent, or Firm* — Eckert Seamans Cherin & Mellott, LLC

(57) ABSTRACT

A system of electronic modules is described, along with a method of assigning addresses to the modules. The modules are communicatively connected along a communication path, and are also communicatively connected to an address bus. Adders are positioned along the address bus, with at least one adder located between each pair of modules. When any module is assigned an address, its adjacent adder will increment the address and assign the incremented address to the next-adjacent module.

19 Claims, 5 Drawing Sheets

(56) References Cited

U.S. PATENT DOCUMENTS

| | | | |
|---|---|---|---|
| 2013/0301495 A1* | 11/2013 | Miller | H04L 12/40006 |
| | | | 370/359 |
| 2016/0205066 A1* | 7/2016 | Attarwala | H04L 61/5038 |
| | | | 709/208 |
| 2017/0046292 A1 | 2/2017 | Teuke | |
| 2017/0270072 A1 | 9/2017 | Gainar et al. | |
| 2018/0276157 A1* | 9/2018 | Lofamia | G06F 13/404 |

* cited by examiner

AUTOMATIC ADDRESS GENERATION FOR MODULAR ELECTRONIC DEVICES

BACKGROUND

Many electronic systems include various addressable modules. For example, many monitoring systems such as fire alarm systems, power monitoring systems, building security monitoring systems, and gas or fluid flow monitoring systems include modules that each include a processor, memory, and optionally one or more sensors that perform various functions. In such a system, each module will be assigned a unique address that the system uses to enable communications in which addresses are used to identify module(s) to which a message is directed. Addresses of a module that generates a message also may be included in the message so that recipients can identify the module from which a message originated.

Currently, traditional methods of assigning addresses to addressable modules include setting switches or jumpers on each module to correspond to an address, or programming a memory device of each module with the module's address. These methods require time during production and/or installation to program or otherwise set the address. This increases the cost and time required for manufacturing, installation, or both. In addition, if modules need to be replaced, the replacement modules must be individually programmed, which adds to repair cost and time.

Some have proposed methods of addressing these problems in particular types of systems. For example, U.S. Patent Application Pub. No. 2017/0270072 to Gainer et al. proposed a set of serially-connected blade test access modules in which each module's processor receives a programmable address, stores the address, increments the address, and passes the incremented address to the next module in the chain. While this processor can help solve some of the issues described above, it requires that each processor be a "smart" module that is programmed to generate an updated address for other modules. It also requires each module to be programmed to recognize which address is intended for it. This requires specially-designed modules, which limits its application and can increase its cost. Further, in situations where communication occurs along a common bus, it requires the entire system to be initialized and addresses assigned to all modules before communication with individual modules is possible.

This document describes methods and systems that are directed to solving at least some of the problems described above.

SUMMARY

As described in more detail below, a modular electronic system may include a set of electronic modules, each of which includes: (i) a processor; (ii) a first communication port; and (iii) a second communication port that is communicatively connected to the address bus. A first wired communication path may be communicatively connected to the first communication ports of each of the electronic module. An address bus may be communicatively connected to the second communication ports of each of the electronic modules to provide a second wired communication path for passing address information between the components of the system. The system also may include adders, each of which is electrically connected to the address bus at a position that is between a corresponding pair of the electronic modules.

Each of the adders may be operable to receive, from a first electronic module of its corresponding pair via the address bus, an address that is assigned to the first electronic module of the corresponding pair. The adder will increment the address to yield an incremented address and assign the incremented address to a second electronic module of the corresponding pair by passing the incremented address to the second electronic module of the corresponding pair via the address bus. Optionally, the system also may include a digital logic device that is electronically connected to the address bus and which is configured to provide a starting address to a first-positioned electronic module in the system.

Optionally, the first wired communication path may include an Ethernet bus; an RS-485 bus; or a network switch and cables wherein each cable connects one of the electronic modules to the network switch.

Optionally, each of the electronic modules also may include a memory device that, during operation, will use the address that is assigned to the electronic module for identification. If so, the system also may include a third communication path with a serial bus that is communicatively connected to each of the memory devices. Optionally, the third communication path may include an $I^2C$ bus.

In some applications, the electronic modules may be components of a power quality meter. The meter may include: (i) a power supply input/output module that is configured to connect to an external power source and deliver power to the other electronic modules of the power quality meter; and (ii) a voltage monitoring module that is configured to acquire data that reflects characteristics of a power supply.

Optionally, each processor of each electronic module may be programmed to generate one or more messages for delivery to a destination module of the electronic modules. For each of the messages, the processor of the electronic module may associate the address of the destination module with the message. The processor may then pass each message and its associated address to at least the destination module via the first wired communication path.

As also described in more detail below, in a system such as that described above a method of communicating between modules may include: (i) receiving a first address via the address bus; (ii) assigning the first address to a first of the electronic modules; and (iii) passing the first address to a first adder that is electrically connected to the address bus at a position that is between the first module and a second of the electronic modules. The first adder may then increment the first address to yield a second address, and it may assign the incremented address to the second module by passing the second address to the second module via the address bus.

A second adder that is electrically connected to the address bus at a position that is between the second module and a third electronic module of the system may then receive the second address via the address bus, increment the second address to yield a third address, and assign the third address to the third module by passing the third address to the third module via the address bus.

The method also may include, by a digital logic device that is electronically connected to the address bus before the first module, providing the first address to the first module via the address bus.

Each of the electronic modules also may include a memory device. Optionally, the method may include, by each memory device, using the address that is assigned to the electronic module of which the memory device is a component. Each memory device also may share its stored information with the other electronic modules via a third communication path that comprises a serial bus that is communicatively connected each of the memory devices.

Optionally, any of the processors may generate one or more messages for delivery to a destination module of the electronic modules. The processor that generates the message may associate the address of the destination module with the message, and the system may pass each message and its associated address to at least the destination module via the first wired communication path.

Optionally, if any module is removed from a position in the system, and if a replacement module is inserted at the position, then one of the adders will assign the address of the removed module to the replacement module by passing the address to the replacement module via the address bus after the replacement module has been inserted at the position. The removed module may then be re-inserted at an alternate position along the first communication path, and if so an adder that is communicatively connected to the address bus at the alternate position may assign an alternate address to the re-inserted module.

In some aspects, a modular electronic system includes a group of electronic modules, an address bus that is communicatively connected to each of the electronic modules to provide a wired communication path for passing address information between the electronic modules, and a set of adders. Each adder is electrically connected to the address bus at a position that is between a corresponding pair of the electronic modules. Each of the adders is operable to: (i) receive, from a first electronic module of the corresponding pair via the address bus, an address that is assigned to the first electronic module of the corresponding pair; (ii) increment the address to yield an incremented address; and (iii) assign the incremented address to a second electronic module of the corresponding pair by passing the incremented address to the second electronic module of the corresponding pair via the address bus. Optionally, the electronic modules may be components of a power quality meter such as a power supply input/output module and a voltage monitoring module as described above.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "connected", when referring to two physical structures, means that the two physical structures touch each other. Devices that are connected may be secured to each other, or they may simply touch each other and not be secured.

In this document, the term "communicatively connected", when referring to two electrical components, means that a communication path exists between the two components. The path may be a direct path, or an indirect path through one or more intermediary components. Unless expressly indicated, the path may be a wired path (meaning that one or more conductive structures provide the path along which signals are passed), a wireless path (meaning that at least some of the signals are transmitted and received via transmitter and receiver components), or a combination of the two.

In this document, the term "electrically connected", when referring to two electrical components, means that a conductive path exists between the two components. The path may be a direct path, or an indirect path through one or more intermediary components.

Additional terms that are relevant to this disclosure will be defined at the end of this Detailed Description section.

Figure 1:
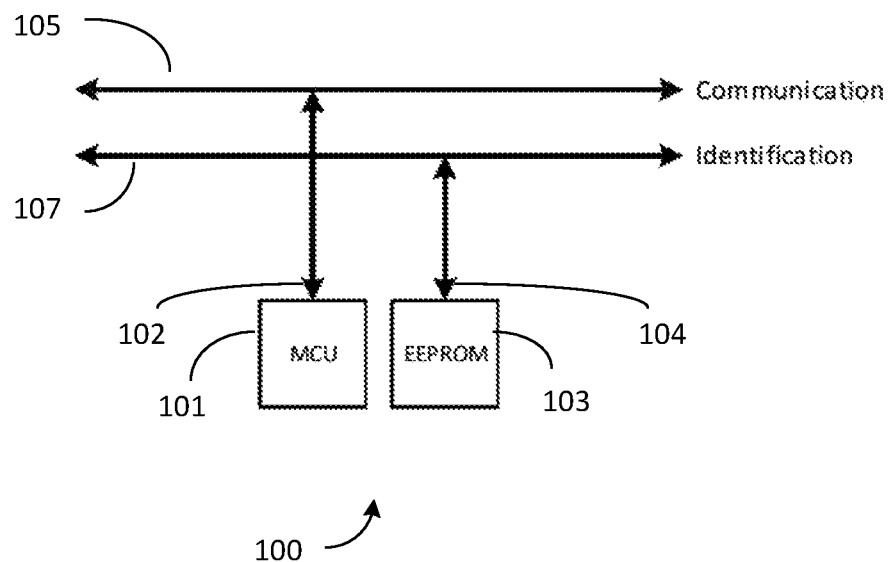
FIG. 1 illustrates example components of an addressable electronic module.

FIG. 1 illustrates example components of an addressable electronic module 100 that is communicatively connected to any number of other addressable electronic modules in an electronic device or system. The module 100 includes a processor 101 such as a microcontroller unit (MCU), microprocessor, or other processing device. The module 100 also includes a memory device 103 such as a flash memory or other type of electrically erasable programmable read-only memory (EEPROM), a random access memory. (Note that in embodiments where element 101 is an MCU, the MCU may include both the processor and memory components.)

Figure 4:
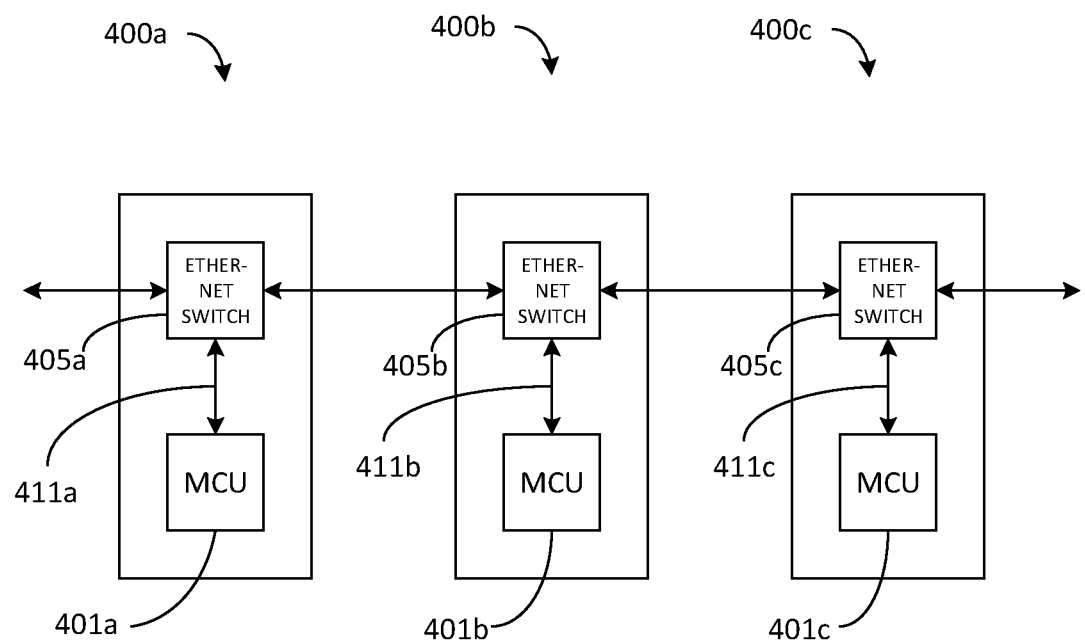
FIG. 4 illustrates an alternate configuration of a communication path in a modular electronic system.

The processor 101 includes a communication port 102 that communicatively connects the processor 101 to a first wired communication path 105 that is configured to pass messages to, from, and between various modules of the system. For example, the first wired communication path 105 may be an Ethernet bus, an RS-485 bus, or a bus that is designed to operate according to any suitable communication protocol. The first wired communication path 105 also may include a cable that leads to a network switch, which will be described in more detail below in the context of FIG. 4.

Optionally, the memory 103 may be communicatively connected to a communication port 104 that communicatively connects the memory 103 to a second wired communication path 107 that is configured to share the module's configuration with other modules of the system for module identification purposes. The second wired communication path may be an Inter-Integrated Circuit (I²C) communication bus or another type of serial data bus.

Figure 2:
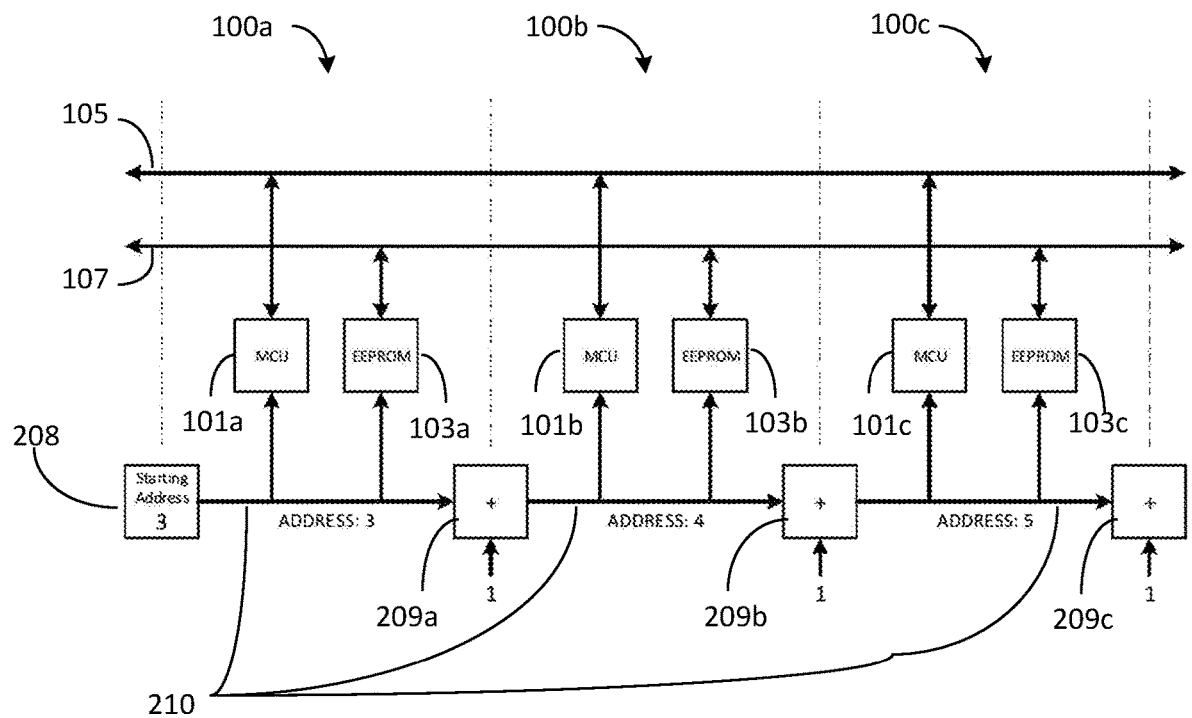
FIG. 2 illustrates example components of a modular electronic system.

FIG. 2 illustrates example components of a modular electronic system in which any number of electronic modules 100a . . . 100c are communicatively connected to the wired communication path 105 in a cascading sequence. Each of the electronic modules 100a . . . 100c is also communicatively connected to an address bus 210 in the same sequence. Each module's processor 101a . . . 101c and memory 103a . . . 103c includes a port that is communicatively connected to the address bus 210 to enable the address bus 210 to provide the module with an address that is assigned to the module.

A first-positioned module 100a in the sequence will receive a starting address. The starting address may be assigned by a manual input, by a random address generator, by a digital logic device 208 that is electronically connected to the address bus 210 and which is configured (such as by programming or hard wiring) to provide the starting address, or by some other means. The first-positioned module 100a will receive the starting address so that the processor 101a may include the address in messages that it generates and sends along communication line 105 so that recipients can identify the module as the sender. In FIG. 2, the starting address is shown as "3" for purposes of simplicity. In practice, the starting address may be any address that may be formatted into a communication protocol of the system, such as an internet protocol (IP) address, a media access control (MAC) address, a Modbus address, or another unique identifier. Optionally, the system may assign multiple addresses to a module if the module is connected to multiple communication paths that require different communication protocols.

In addition to the processor 101a using the address, the memory 103a also may retrieve the address from the address bus 210 and use the address for communication on communication path 107. Communication line 107 may also be considered to be an address bus, but unlike address bus 210 which assigns addresses, address bus of communication line 107 uses already-assigned addresses for module identification purposes. For example, in FIG. 2 module 100b is given an address of 4. When EEPROM 103b address 5 is read from address bus 107, it will return information about that module (such as a module type, build date and/or version).

A set of adders 209a, 209b, 209c will be included along the address bus 210. Each adder is positioned between a corresponding pair of the modules. Each adder 209a, 209b, 209c may be a separate hardware element, or it may be component of one of the pair of modules but positioned to be at the output of a first module of the pair or at the input of a second module of the pair. Each adder 209a, 209b, 209c may be an integrated circuit (such as a half adder incorporating an XOR gate and an AND gate, or a full adder incorporating NAND gates), a programmable device such as a field programmable gate array (FPGA) or complex programmable logic device (CPLD), or any other electronic device that is configured to receive an address from a previous module and increment the address by an additional amount (typically, although not necessarily, by an increment of one).

For example, in the simple example of FIG. 2, adder 209a receives the starting address ("3") from the digital logic device 208 along the address bus 210, increments the starting address by one (to "4"), and passes the incremented address ("4") to the second module 100b via the address bus 210. Adder 209b then receives the incremented address ("4") from address bus 210 after the second module 100b, increments the address again by one (to "5"), and passes the further incremented address ("5") to the third module 100c via the address bus 210. This process will continue for as many modules as may exist in the system.

Figure 3:
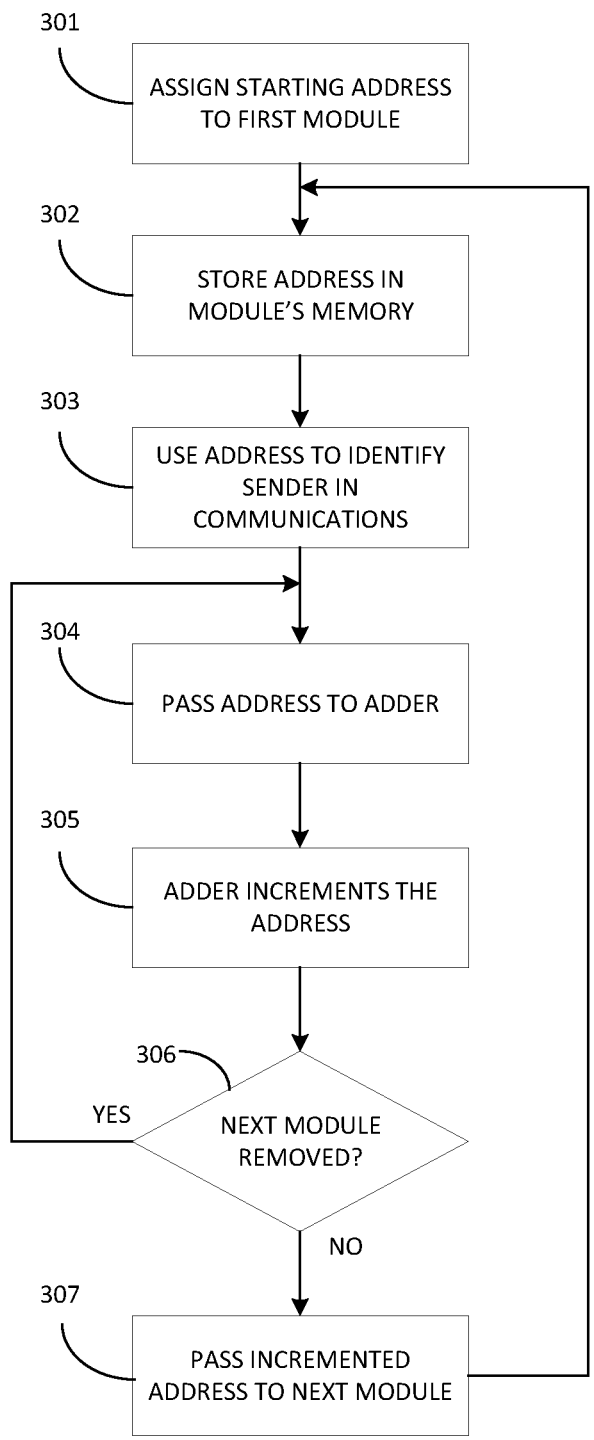
FIG. 3 illustrates an example method of assigning addresses to addressable modules of a modular electronic system.

FIG. 3 illustrates an example process flow for how a system such as that of FIG. 2 may operate. At 301, a first module of the system will receive a first address via the address bus. If the first module is the first-positioned module of the sequence, the address may be a starting address assigned by a digital logic device or other input. If the first module is not the first-positioned module of the sequence, the first address will be an address received from an earlier-positioned adder. The system will assign the first address to the first module, which may include storing the address in the module's memory (at 302) for sharing with other modules and/or devices. The system also may use the address in communications to identify the sender of the message (at 303), for example by generating one or more messages for delivery to a destination module and, for each of the messages, associating the address of the destination module with the message and passing each message and its associated address to at least the destination module via the first wired communication path.

At 304 the address bus will then pass the first address to a first adder that is electrically connected to the address bus at a position that is between the first module and a next module in the sequence. At 305 the first adder will increment the first address to yield a second address. The act of incrementing may be simply adding one to the value of the address, or it may be another increment (such as an increment of two, or an increment of a letter value in a hexadecimal addressing system, or another increment). At 307 the system may then assign the incremented address to the second module by passing the second address to the second module via the address bus, which will then store and/or use the assigned address as described in steps 302 and 303 above. This process will repeat for each adder/module combination in the sequence.

If a module is removed from the system (306:YES), and if the adders are separate components then instead of assigning the incremented address to that module the system will simply pass the incremented address to the next adder, which will increment the adder again for a subsequent module in the sequence (repeating step 304). (If the adders are components of the modules, then the incrementing will not occur before or after the removed module, and the address that would have been assigned to the removed module will simply be assigned to the next module in the sequence.) When a replacement module is inserted at a position in the system where the module was previously present, the address generated by the adder that was positioned prior to that module in the sequence will be assigned to the inserted module. If a module is removed and re-inserted at a different location in the system, then when re-inserted it will receive the address that is the incremented address of its preceding neighbor in the sequence. In this way, addresses are automatically assigned as modules are swapped out, moved, or otherwise reconfigured in the system.

The configuration described above is useful in a system that shares a common communication bus, as in communication path 105 of FIGS. 1 and 2, which may be for example an Ethernet bus. In such a system, communication along the path 105 must be addressed, otherwise all modules may respond to the communication. One way that it can be useful is that it can reduce the time required for initialization and assignment of addresses to all modules before communication can occur, which would be the case if each module's processor were to generate and assign an address. However, this disclosure is not limited to such embodiments. It also may be used in a system such as that of FIG. 4, in which each module 400a . . . 400c includes a communication port that is connected to a wired communication path 411a . . . 411c leading to elements 405a . . . 405c of a network switch such as an Ethernet switch, or a transceiver such as an RS-485 transceiver. Although FIG. 4 appears to show switch as three switch elements 405a ... 405c, in implementation each of the switch elements 405a ... 405c may be a port or other input component of a multi-port switching device.

Figure 5:
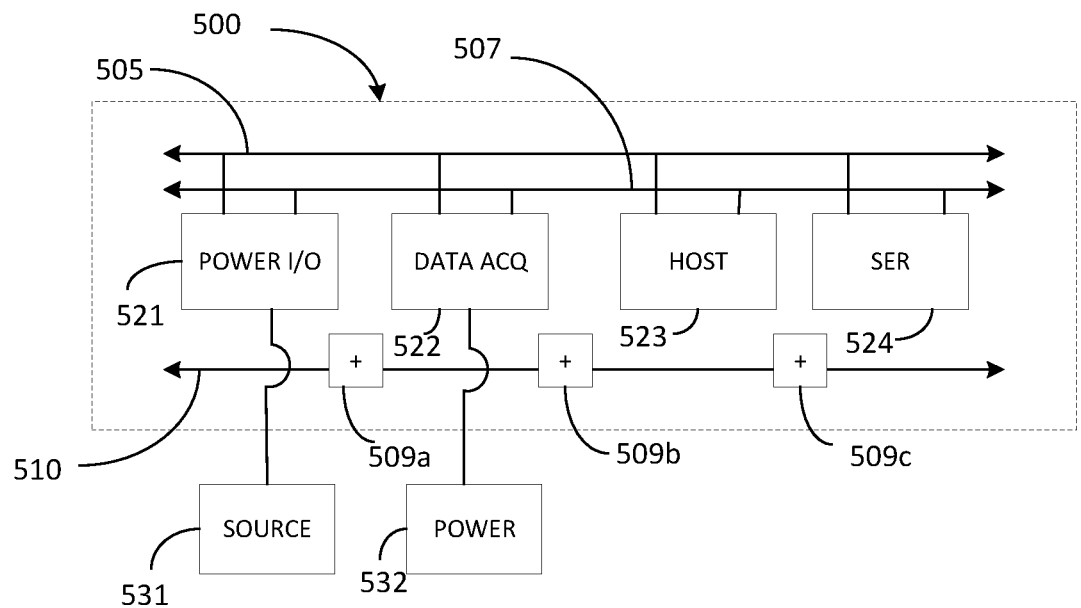
FIG. 5 is a block diagram showing example components of a modular power quality monitoring system.

The modular electronic system described above may be of multiple electronic devices (such as a server system made of multiple storage modules or computing devices); a monitoring system such as a fire alarm system, a power monitoring system, a building security monitoring system, or a gas or fluid flow monitoring system; or any other modular electronic system. For example, referring to FIG. 5, a power quality meter 500 may include a power supply input/output module 521 that is configured to connect to an external power source 531 and deliver power to the other electronic modules of the power quality meter. The meter 500 also may include a data acquisition module 522 that is configured to acquire data that reflects characteristics of a power supply 532, such as a voltage monitor and/or current monitor. The meter 500 also may include a host processor module 523 that serves as a main hub that other modules of the system serve. The meter 500 also may include a sequence of event recorder (SER) module 522 that is configured to record and optionally output indicators of various monitored events. The meter 500 also may include various other modules Similar to the configuration shown in FIG. 2, in FIG. 5 each module is communicatively connected to a first wired communication path 505 such as an Ethernet bus or Ethernet switch, a second wired communication path 507 for transmitting identification information of each module, and an addressing bus 510 with adders 509a ... 509c between each module.

The following terms have the following meanings in this document:

An "electronic device" or an "electronic module" refers to a device or system that includes a processor and memory. The processor and memory may be separate devices, or they may be components of a common device such as a microcontroller. The memory may contain or receive programming instructions that, when executed by the processor, cause the electronic device to perform one or more operations according to the programming instructions.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory" and "memory device" each refer to a non-transitory device on which computer-readable data, programming instructions or both are stored. Except where specifically stated otherwise, the terms "memory" and "memory device" are intended to include single device embodiments, embodiments in which multiple memory devices together or collectively store a set of data or instructions, as well as individual sectors within such devices.

In this document, the terms "communication link" and "communication path" mean a wired or wireless path via which a first device can send communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A modular electronic system, comprising:
a plurality of electronic modules, each of which comprises:
a processor,
a first communication port, and
a second communication port that is communicatively connected to an address bus;
a first wired communication path that is communicatively connected to the first communication ports of each of the electronic modules;
the address bus that is communicatively connected to the second communication ports of each of the electronic modules to provide a second wired communication path for passing address information between components of the system; and
a plurality of adders included along the address bus, each of which is a separate hardware element from each electronic module and electrically connected to the address bus at a position that is between a corresponding pair of the electronic modules, each adder being operable to:
receive, from a first electronic module of the corresponding pair via the address bus, a first address that is assigned to the first electronic module;
increment the first address to yield a second address; and
pass the second address to a second electronic module of the corresponding pair and a second adder that is electrically connected to the address bus at a position that is between the second module and a third module following the second module.

2. The system of claim 1, wherein each of the adders is operable to:
assign the second address to the second electronic module of the corresponding pair by passing the second address to the second electronic module of the corresponding pair via the address bus.

3. The system of claim 2, wherein the system also comprises a digital logic device that is electronically connected to the address bus and which is configured to provide a starting address to a first-positioned electronic module of the plurality of electronic modules.

4. The system of claim 1, wherein the first wired communication path comprises:
an Ethernet bus;
an RS-485 bus; or
a network switch and a plurality of cables, wherein each cable connects one of the electronic modules to the network switch.

5. The system of claim 2, wherein each of the plurality of electronic modules further comprises a memory device that, during operation, will use the address that is assigned to the electronic module for identification.

6. The system of claim 5, further comprising a third communication path that comprises a serial bus that is communicatively connected each of the memory devices.

7. The system of claim 6, wherein the third communication path comprises an $I^2C$ bus.

8. The system of claim 1, wherein the plurality of electronic modules are components of a power quality meter and comprise:
a power supply input/output module that is configured to connect to an external power source and deliver power to the other electronic modules of the power quality meter; and
a voltage monitoring module that is configured to acquire data that reflects characteristics of a power supply.

9. The system of claim 1, wherein each processor of each electronic module is configured to:
generate one or more messages for delivery to a destination module of the plurality of electronic modules;
for each of the messages, associate the address of the destination module with the message; and
pass each message and its associated address to at least the destination module via the first wired communication path.

10. A method of communicating between modules of a modular electronic system, comprising:
in the system that comprises (i) a plurality of electronic modules that are communicatively connected in series along a first wired communication path, each electronic module including a processor, and (ii) an address bus that provides a second wired communication path for passing address information between components of the system:
receiving a first address via the address bus;
assigning the first address to a first module of the plurality of electronic modules;
passing the first address to a first adder that is electrically connected to the address bus at a position that is between the first module and a second module of the plurality of electronic modules, the first adder included along the address bus and being a separate hardware component from the first module and the second module; and
by the first adder:
incrementing the first address to yield a second address, and
passing the second address to the second module and a second adder that is electrically connected to the address bus at a position that is between the second module and a third module following the second module via the address bus.

11. The method of claim 10 further comprising, by the second adder:
receiving the second address via the address bus;
incrementing the second address to yield a third address; and
assigning the third address to the third module by passing the third address to the third module via the address bus.

12. The method of claim 10 further comprising, by a digital logic device that is electronically connected to the address bus before the first module:
providing the first address to the first module via the address bus.

13. The method of claim 10, wherein:
each of the plurality of electronic modules further comprises a memory device; and
the method further comprises, by each memory device, using the address that is assigned to the electronic module of which the memory device is a component.

14. The method of claim 13, further comprising, by each of the memory devices, sharing its stored information with the other electronic modules via a third communication path that comprises a serial bus that is communicatively connected each of the memory devices.

15. The method of claim 10, further comprising, by the processor of any of the plurality of electronic modules:
generating one or more messages for delivery to a destination module of the plurality of electronic modules;
for each of the messages, associating the address of the destination module with the message; and
passing each message and its associated address to at least the destination module via the first wired communication path.

16. The method of claim 10 further comprising:
removing the second module from the system;
inserting a replacement module at a position in the system where the second module was previously present; and
by the first adder, assigning the second address to the replacement module by passing the second address to the replacement module via the address bus after the replacement module has been inserted at the position in the system where the second module was previously present.

17. The method of claim 16 further comprising:
re-inserting the second module into the system at an alternate position along the first communication path;
by an adder that is communicatively connected to the address bus at the alternate position, assigning an alternate address to the second module by passing the alternate address to the second module via the address bus after the second module has been inserted at the alternate position.

18. A modular electronic system, comprising:
a plurality of electronic modules;
an address bus that is communicatively connected to each of the electronic modules to provide a wired communication path for passing address information between the electronic modules;
a plurality of adders included along the address bus, each of which is a separate hardware component from each electronic module and electrically connected to the address bus at a position that is between a corresponding pair of the electronic modules, wherein each of the adders is operable to:
receive, from a first electronic module of the corresponding pair via the address bus, an address that is assigned to the first electronic module of the corresponding pair,
increment the address to yield an incremented address, and
assign the incremented address to a second electronic module of the corresponding pair by passing the incremented address to the second electronic module of the corresponding pair and a second adder that is electrically connected to the address bus at a position that is between the second module and a third module following the second module via the address bus.

19. The system of claim 18, wherein the plurality of electronic modules are components of a power quality meter and comprise:
a power supply input/output module that is configured to connect to an external power source and deliver power to the other electronic modules of the power quality meter; and
a voltage monitoring module that is configured to acquire data that reflects characteristics of a power supply.

* * * * *